United States Patent [19]

Wada et al.

[11] Patent Number: 4,625,565
[45] Date of Patent: Dec. 2, 1986

[54] WIND VELOCITY SENSOR

[75] Inventors: Eiichi Wada, Takatsuki; Motohiro Gahara, Kobe; Hiroaki Tsubakishita, Nishinomiya, all of Japan

[73] Assignee: Sinko Kogyo Co., Ltd., Osaka, Japan

[21] Appl. No.: 720,377

[22] Filed: Apr. 5, 1985

[30] Foreign Application Priority Data

Apr. 9, 1984 [JP] Japan .................................. 59-71447

[51] Int. Cl.[4] .............................................. G01F 1/28
[52] U.S. Cl. .............................. 73/861.74; 73/DIG. 3
[58] Field of Search ................ 73/189, 861.71, 861.74, 73/861.75, DIG. 3; 324/207, 208; 338/32 H

[56] References Cited

U.S. PATENT DOCUMENTS 3,208,276 9/1965 Wood et al. ..................... 73/DIG. 3

OTHER PUBLICATIONS

"Applying Linear Output Hall Effect Transducers" in Solid State Application Note by Honeywell 1984 (pp. 1-3).

McCall, Jr. et al., "A Linear Position Transducer Using Hall Effect Devices" in IEEE Trans., vol. IM-26 #2, 6/77, pp. 133-136.

Sinha "Analog Measurement of Position Using Hall Effect" in IEEE Trans., vol. IECI-26 #3, 8/79, pp. 196-198.

Primary Examiner—Herbert Goldstein
Attorney, Agent, or Firm—Birch, Stewart, Kolasch & Birch

[57] ABSTRACT

A wind velocity sensor provided with a stationary base having a permanent magnet or a Hall element fixed thereon, an elastic plate having the other of the permanent magnet and the Hall element fixed to a portion opposite to the one of the permanent magnet and the Hall element, and an inversion amplifier having the outputs of the Hall element inputted thereto, the inversion amplifier developing a liner output with respect to wind velocity.

3 Claims, 8 Drawing Figures

WIND VELOCITY SENSOR

BACKGROUND OF THE INVENTION

1. Field of the Invention

The present invention relates to a wind velocity sensor which is ideal if it is used in an airflow controlling apparatus or the like.

2. Description of the Prior Art

There have been conventionally proposed various types of fan-driven wind velocity sensors, hot-wire wind velocity sensors, etc. as wind velocity sensors. Such sensors are complicated in construction, relatively expensive, and furthermore disadvantageously require complicated electronic circuits for developing linear output signals for the air speed.

SUMMARY OF THE INVENTION

Accordingly, an object of the present invention is to provide a wind velocity sensor which can eliminate the disadvantages inherent to the conventional sensors discussed above, and which is simpler in construction, lower in price, and is capable of not only correctly detecting the wind velocity, but also easily developing linear output signals representative of the wind velocity.

The wind velocity sensor of the present invention comprises a stationary base and an elastic plate mounted on said base and standing up on the base so as to be deformable upon receiving an external force on the surface and being able to return to the initial position after removing the external force. The sensor further includes a permanent magnet mounted on the elastic plate and a Hall element for generating electromotive force under an influence of magnetic flux developed by said permanent magnet and fixed on the base facing the magnet with a gap provided therebetween, the dimension of said gap varying in accordance with the position of said elastic plate. The sensor further includes an electric circuit including an inversion amplifier connected to the Hall element to monitor an electric output signal therefrom, said inversion amplifier being adapted to increase the output signal in linear proportion to the wind velocity.

BRIEF DESCRIPTION OF THE DRAWINGS

This and other objects and features of the present invention will become apparent from the following description taken in conjunction with the preferred embodiments thereof with reference to the accompanying drawings, in which.

DESCRIPTION OF THE PREFERRED EMBODIMENTS

Figure 1:
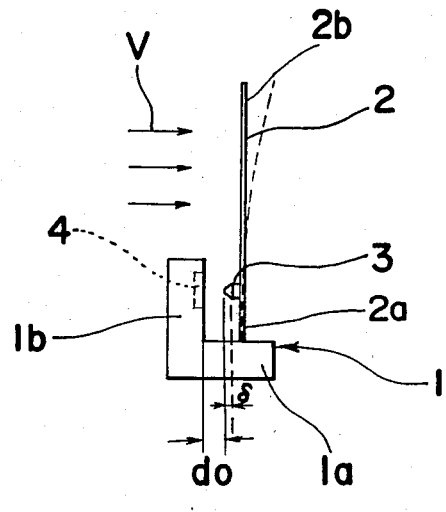
FIG. 1 is a front view of a wind velocity sensor in one embodiment of the present invention.

Before the description of the present invention proceeds, it is to be noted that like parts are designated by like reference numerals throughout several views of the accompanying drawings.

Figure 2:
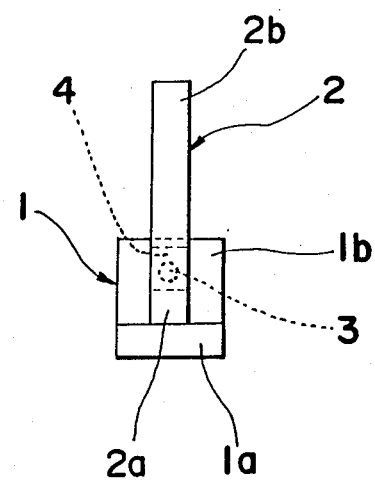
FIG. 2 is a right side view of the sensor of FIG. 1.

Referring to FIGS. 1 and 2, in accordance with one preferred embodiment of the present invention, there is shown a wind velocity sensor comprising a stationary base 1 for supporting the other parts thereon, an elastic plate 2 having a stem portion 2a mounted standing up on the base 1 and a leaf portion 2b extending from the stem portion, bendable about the stem portion and including a surface for receiving the pressure of wind to detect the velocity thereof. A permanent magnet 3 is secured on the middle portion of the elastic plate 2 so as to be able to change the position thereof with respect to the base 1 in accordance with the bending of the elastic plate 2 developed by the with pressure. A Hall element 4 generates electromotive force under the influence of magnetic flux developed by said permanent magnet 3 and is fixed on the base 1 facing the permanent magnet 3 with a gap $d_0$ therebetween so that the amount of gap changes in accordance with the position of the magnet 3, the magnitude of the electromotive force depending upon the amount of gap between the magnet 3 and Hall element 4. An electric circuit is provided for developing an output from the Hall element 4.

As shown in FIGS. 1 and 2, the base 1 is formed in an L-shape having a horizontal portion 1a on which the elastic plate 2 is mounted in the vertical position, and a vertical portion 1b on which the Hall element 4 is fixed with a front surface thereof facing the magnet 3 provided on the middle portion of the elastic plate 2 in a horizontal direction. The elastic plate 2 is formed of a strip of plate made of a flexible material and being deformable upon receiving an external force on the leaf portion 2b and, after removing the external force, being capable of returning to an initial position by itself by movement around the lower end of stem portion 2a fixed on the base.

Upon subjecting the leaf portion 1b of elastic plate 2 to wind pressure, the magnet 3 is adapted to change position in relation with the front surface of Hall element 4 in accordance with the bending shape of elastic plate 2 which bends upon the application of wind pressure thereto, i.e., air pressure, having a velocity to be detected. In the static state where no air pressure is applied to the elastic plate 2, there is provided a gap of dimension $d_0$ between the magnet 3 and the front surface of Hall element 4. The circuit includes an inversion amplifier 5 illustrated in FIG. 4 for receiving the output signal of the Hall element 4 and developing a signal corresponding to the sensed wind pressure and thus velocity applied to the elastic plate through use of the inversion amplifier 5 and an integrator $R_5$, $C_1$, as shown in FIG. 4. The operation of Hall element 4 is schematically shown in FIG. 3 for the purpose of explanation thereof in association with the circuit of FIG. 4.

Figure 3:
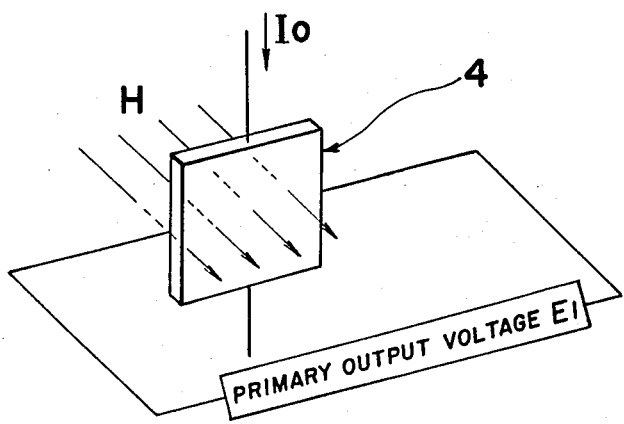
FIG. 3 is a perspective view of a Hall element employed in the sensor of FIG. 1.
Figure 4:
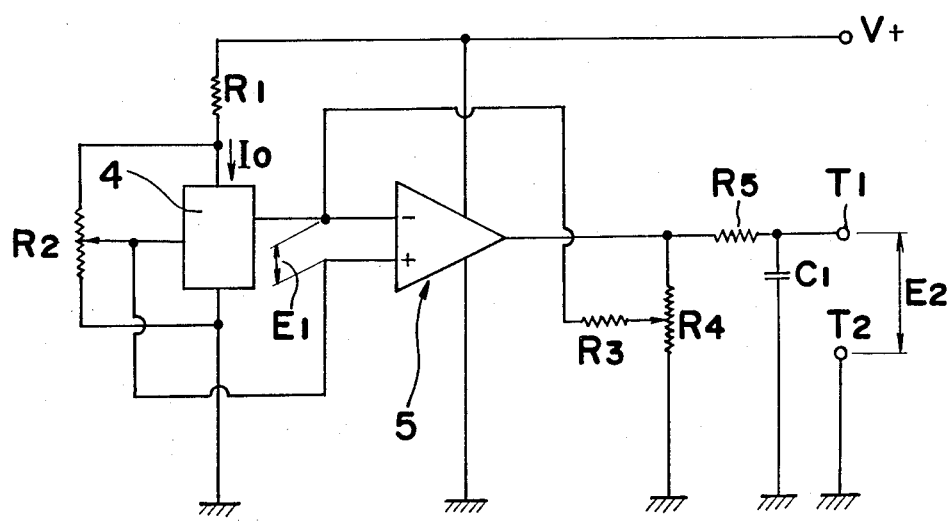
FIG. 4 is an electric circuit diagram of a circuit associated with the Hall element of FIG. 3.

As shown in FIG. 3, when current 1 is made to meet at right angles with magnetic flux H, the Hall element 4 develops electromotive force $E_1$ (hereinafter referred to as primary output voltage) in the direction perpendicular to them, so that the primary output voltage $E_1$ equals $RH1_0$ $$E_1 = RH1 \qquad 1$$

wherein R is a Hall coefficient.

The primary output voltage $E_1$ of the Hall element 4 is applied upon an inversion amplifier 5 as shown in FIG. 4 so as to get the secondary output voltage $E_2$ $[E_2=(E_1max-E_1)]$. The value $E_1max$ is a constant value to be described later. Referring to FIG. 4, in the circuit there are provided resistors $R_1$, $R_3$, a variable resistor $R_2$ for regulating a zero point, a variable resistor $R_4$ for regulating output width, a DC power supply $V+$, and output terminals $T_1$, $T_2$. Also, the combination of a resistor $R_5$ and a capacitor $C_1$ functions as integrator to average the output voltage variation, which is obtained from the Hall element to compensate for the natural vibration of the elastic plate 2 due to the wind velocity.

The leaf portion 2b of the elastic plate 2 of the above-described construction is disposed perpendicular to the wind velocity V to be measured as shown in FIG. 1.

Thus, the wind pressure P caused by wind having a wind velocity V is applied upon the leaf portion of the elastic plate 2 directly at the front surface and is proportional to the square of the wind velocity V to provide the following equation.

$$P \propto V^2 \qquad (2)$$

The elastic plate 2 is deformed, as shown with the broken line in FIG. 1, by the wind pressure P and the deflection $\delta$ of the middle portion of elastic plate 2 where the permanent magnet 3 is provided is proportional to the wind pressure P to provide the following equation.

$$\delta \propto P \qquad (3)$$

Accordingly, from the above equations (2) and (3), the following equation is provided.

$$\delta \propto V^2 \qquad (4)$$

Figure 5:
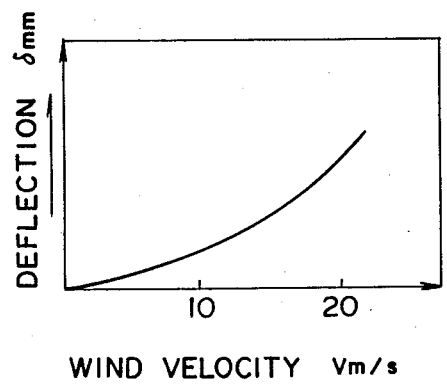
FIGS. 5 through 8 are characteristic charts of various factors relating to the sensor, respectively.

The relationship of equation (4) is shown in FIG. 5, with the provision of the X-axis of wind velocity (Vm/s) and the Y-axis of deflection ($\delta$ mm).

On the other hand, the gap d to be disposed between the Hall element 4 and the permanent magnet 3 is the total of the deflection $\delta$ caused under the influence of the wind pressure and the gap $d_0$ disposed in a state that the wind velocity is zero, thus resulting in the following equations.

$$d = d_0 + \delta \qquad (5)$$

$$d = F(V^2) \qquad (6)$$

On the other hand, the magnetic flux density H caused by the influence of the permanent magnet 3 on the Hall element 4, is determined by the dimensions of gap d between the Hall element 4 and the permanent magnet 3, and is inversely proportional to the square of the gap d to provide the following equation.

$$H \propto \frac{1}{d^2} \qquad (7)$$

Accordingly, from the above equations (1) and (7), the primary output voltage $E_1$ becomes as follows.

$$E_1 \propto \frac{1}{d^2} \qquad (8)$$

Figure 6:
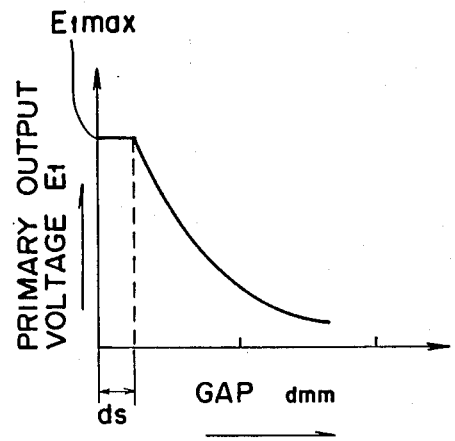

The relationship of (8) is shown in FIG. 6, with the provision of the X-axis of gap (mm) and the Y-axis of primary output voltage ($E_1$) developed between the character ds is a saturation gap, i.e., what is called a saturation distance, which is determined by the performance of the Hall element 4, and the impressed current value $I_0$. This saturation distance is the distance which becomes a given value $E_1$ max through the saturation of the primary output voltage $E_1$.

Accordingly, input the primary output voltage $E_1$ into the inversion amplifier 5 as shown in FIG. 4 and the secondary output voltage $E_2$ is provided as follows.

$$E_2 = E_1 \max - E_1 \qquad (9)$$

Figure 7:
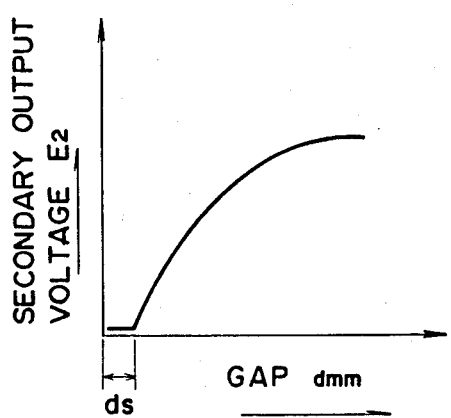

The relationship between the gap d (mm) of the X-axis and the secondary output voltage $E_2$ of the Y-axis is shown in FIG. 7. In this relationship, the secondary output voltage $E_2$ is considered to be proportional to a value close to one second power of the gap d, in which the slope of the secondary output voltage $E_2$ gradually reduces as the gap d increases. Namely, it can be considered to approximate the following equation.

$$E_2 \propto d^{\frac{1}{2}} \qquad (10)$$

Figure 8:
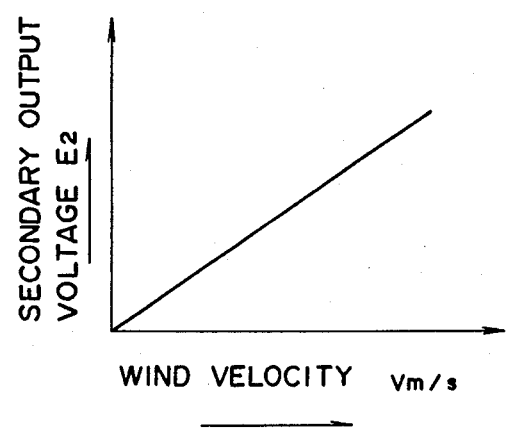

Therefore, from the above equations (10) and (6), the relationship of $$E_2 \propto V \qquad (11)$$

is provided. Namely, the secondary output voltage $E_2$ can be obtained as a detection signal, which is linear with respect to the wind velocity V and increases as the wind velocity V increases. This relationship between the secondary output voltage $E_2$ and wind velocity V is shown in FIG. 8, with the provision of the X-axis of wind velocity (m/s) and the Y-axis of second output voltage ($E_2$). Accordingly, the wind velocity V causing the deflection of the elastic plate can be detected by the secondary output voltage $E_2$ of the circuit through the Hall element and permanent magnet.

In summary, the primary output voltage $E_1$ of the Hall element 3 per se decreases as shown in FIG. 6 with increase of the gap d. However, the inversion amplifier 5 is adapted to invert the value of the primary output voltage $E_1$ of the Hall element 3 to increase the value of the secondary output voltage $E_2$ with increase of the gap d as shown in FIG. 7. Thus, the value of the secondary output voltage $E_2$ is linearly proportional to the wind velocity V as shown in FIG. 8.

According to the present invention, the wind velocity sensor is constructed as described hereinabove is capable of correctly detecting the wind velocity and developing output detection signals which are linear with respect to the wind velocity using simplified, low-priced construction. The wind velocity sensor of the present invention has advantages in that, as compared with the conventional one, the wind velocity sensor is not consumed and worn away, is hardly affected by dust, is simpler in construction and also is lower in price.

Although the present invention has been fully described by way of example with reference to the accompanying drawings, it is to be noted here that various changes and modifications will be apparent to those skilled in the art. For instance, the magnet and Hall element can change their positions with each other in such a manner that the magnet is fixed on the base while wise such changes and modifications depart from the scope of the present invention, they should be construed as included therein.

What is claimed is:

1. A wind velocity sensor comprising:
   a stationary base;
   a resilient plate presented in a windstream and receiving the force provided thereby, said resilient plate being mounted to said base with a fixed end thereof and flexing about said fixed end in response to the force of said windstream and returning to an initial rest position after removal of said windstream provided force;
   a permanent magnet mounted on either one of said resilient plate or said base;
   a Hall element for generating electromotive force under an influence of magnetic flux and fixed on either the other of said base or said resilient plate and facing the magnet with a gap provided therebetween, the dimension of said gap varying with the position of said resilient plate, said Hall element developing an output inversely proportional to the square of said gap dimension;
   electric circuit means including an inversion amplifier connected to the output of said Hall element for developing an electric output signal therefrom, said inversion amplifier varying said output signal in linear proportion to the wind velocity.

2. The sensor defined by claim 1, wherein said resilient plate is formed of a strip of plate made of flexible material.

3. The sensor of claim 1 further comprising an integrator to integrate said output signal over time to dampen the effect of wind induced vibration of said resilient plate on said output signal.

* * * * *